US012752669B2

(12) United States Patent
Quast et al.

(10) Patent No.: US 12,752,669 B2
(45) Date of Patent: Oct. 6, 2026

(54) GEAR UNIT, GEARED MOTOR AND LONGITUDINAL ADJUSTER

(71) Applicant: Adient US LLC, Plymouth, MI (US)

(72) Inventors: Ingo Quast, Düsseldorf (DE); Erik Sprenger, Wermelskirchen (DE)

(73) Assignee: Adient US LLC, Plymouth, MI (US)

( * ) Notice: Subject to any disclaimer, the term of this patent is extended or adjusted under 35 U.S.C. 154(b) by 120 days.

(21) Appl. No.: 18/698,092

(22) PCT Filed: Oct. 13, 2022

(86) PCT No.: PCT/IB2022/059806
§ 371 (c)(1),
(2) Date: Apr. 3, 2024

(87) PCT Pub. No.: WO2023/062567
PCT Pub. Date: Apr. 20, 2023

(65) Prior Publication Data

US 2024/0399935 A1 Dec. 5, 2024

(30) Foreign Application Priority Data

Oct. 13, 2021 (DE) ..................... 10 2021 211 518.7
Mar. 31, 2022 (DE) ..................... 10 2022 203 224.1

(51) Int. Cl.
*B60N 2/06* (2006.01)
*B60N 2/02* (2006.01)
(Continued)

(52) U.S. Cl.
CPC ......... *B60N 2/02253* (2023.08); *B60N 2/067* (2013.01); *F16C 19/06* (2013.01);
(Continued)

(58) Field of Classification Search
CPC ............ F16H 2025/2081; B60N 2/067; B60N 2/02253; B60N 2/164; B60N 2/1853; B60N 2/23; B60N 2/233
See application file for complete search history.

(56) References Cited

U.S. PATENT DOCUMENTS 8,113,074 B2 * 2/2012 Wohrle .................. F16H 25/24
74/424.74
8,453,529 B2 * 6/2013 Birker .................... B60N 2/067
74/424.74
(Continued)

FOREIGN PATENT DOCUMENTS

DE 19912978 A1 2/2000
DE 102005023095 A1 12/2005
(Continued)

OTHER PUBLICATIONS

European Patent Office, International Search Report and Written Opinion in Application No. PCT/IB2022/059806, dated Dec. 13, 2022, 9 pages, Rijswijk, Netherlands.

*Primary Examiner* — Randell J Krug
(74) *Attorney, Agent, or Firm* — Marshall & Melhorn, LLC

(57) ABSTRACT

A gear unit may have a housing and a gearwheel arranged in the housing. To mount the gearwheel in the housing, a bearing arrangement is provided and designed such that the gearwheel is supported spring-elastically axially, and is mounted movably, in relation to the housing. The gear unit may also be used in a geared motor and with a longitudinal adjuster for a vehicle seat having the geared motor.

12 Claims, 9 Drawing Sheets

(51) Int. Cl.

| | |
|---|---|
| ***F16C 19/06*** | (2006.01) |
| ***F16H 25/20*** | (2006.01) |
| ***F16H 57/00*** | (2012.01) |
| ***F16H 57/021*** | (2012.01) |
| ***F16H 57/023*** | (2012.01) |
| *F16H 57/02* | (2012.01) |

(52) U.S. Cl.

CPC ......... *F16H 25/20* (2013.01); *F16H 57/0006* (2013.01); *F16H 57/021* (2013.01); *F16H 57/023* (2013.01); *F16C 2361/61* (2013.01); *F16H 2025/2081* (2013.01); *F16H 2057/02034* (2013.01); *F16H 2057/02082* (2013.01)

(56) References Cited

U.S. PATENT DOCUMENTS

| | | | | |
|---|---|---|---|---|
| 2018/0319420 | A1* | 11/2018 | Huber .................... | B62D 1/181 |
| 2022/0048409 | A1* | 2/2022 | Sprenger ................ | B60N 2/067 |

FOREIGN PATENT DOCUMENTS

| | | | | | |
|---|---|---|---|---|---|
| DE | 102011080914 | A1 | 2/2013 | | |
| DE | 102012200834 | A1 | 7/2013 | | |
| DE | 102017008036 | A1 | 3/2018 | | |
| DE | 102016224512 | A1 | 6/2018 | | |
| EP | 1992842 | A2 | 11/2008 | | |
| EP | 2001703 | B1 | 12/2008 | | |
| KR | 20190141675 | A | * 12/2019 | ......... | F16H 25/2204 |
| WO | 2020020835 | A1 | 1/2020 | | |

* cited by examiner

GEAR UNIT, GEARED MOTOR AND LONGITUDINAL ADJUSTER

FIELD

The invention relates to a gear unit, and to a geared motor having such a gear unit, and to a longitudinal adjuster of a vehicle seat having such a geared motor.

BACKGROUND

A drive device is known from DE 10 2005 023 095 A1. The drive device for use with a motor vehicle seat guiding device comprises matching fixed and movable rail parts which can be moved between a front position and a rear position. The drive device comprises an extended spindle, a spindle nut, a gear and an installation device. The spindle defines a spindle axis and has a spindle thread extending in the longitudinal direction. The spindle nut can be securely fastened to a first rail part and has an internal thread that can engage in the spindle thread. The gear can be assembled on a respective other rail part and rotates the spindle selectively about the spindle axis. The spindle of the drive device is provided with a spindle wheel which in the assembled state of the drive device extends outwards through spindle wheel openings of the movable rail part.

SUMMARY

The invention is based on the object of specifying a simplified gear unit and a geared motor which is particularly cost-effective and is optimized in terms of friction occurring therein, and of specifying a longitudinal adjuster having such a geared motor.

The first object mentioned is achieved according to the invention by a gear unit which has at least one housing, a gearwheel disposed in the housing, and for mounting the gearwheel in the housing at least one bearing assembly which is designed in such a manner that the gearwheel is supported so as to be at least axially spring-elastic and mounted so as to be movable in relation to the housing.

A first bearing assembly comprises at least one first spring module and at least one first bearing module. The first spring module and the first bearing module are designed as a resiliently mounted bearing for the gearwheel in the housing, and are disposed on at least one end of the gearwheel in such a manner that the gearwheel is supported so as to be axially spring-elastic and mounted so as to be movable in relation to the housing. A resiliently mounted bearing for supporting the gearwheel in an axially spring-elastic manner is understood to mean in particular a resilient mounting of a plurality of balls acting in the axial direction, so as to absorb axially acting shocks.

The gearwheel can be supported in an axial spring-elastic manner and be movably mounted on the housing indirectly, for example by way of the first spring module and the first bearing module, and/or directly. For example, the gearwheel on its frontal ends has a collar. The first spring module and the first bearing module can be disposed on the collar. The collar can be of such a length that said collar protrudes from the first spring module and the first bearing module. This protruding end of the collar can be disposed directly opposite a housing portion.

In other words: the gearwheel can be supported so as to be axially spring-elastic in relation to the housing, and directly on the housing by the combination of the first spring module and the first bearing module. One first spring module in combination with one first bearing module can be disposed on each end face of the gearwheel.

For example, the gearwheel is disposed in particular in an axially spring-elastic manner and movably mounted in the housing by the combination of the first bearing module and the first spring module on at least one of the gearwheel ends, or preferably pre-loaded at both gearwheel ends. In particular, the at least one first spring module is specified and disposed in such a manner that the gearwheel is disposed so as to be pre-loaded in the housing.

For example, the first spring module, or the first spring modules, is/are specified in such a manner that a corresponding spring force acts on the gearwheel by way of the first bearing module, or the first bearing modules, respectively, on the one hand, and the gearwheel by way of the first spring module, or the first spring modules, is supported in a spring-elastic manner on the housing, in particular indirectly, on the other hand. Moreover, the at least one first bearing module and the at least one spring module can be coupled and specified in such a manner that a resiliently mounted bearing, in particular a resiliently mounted roller bearing or ball bearing, for the gearwheel is formed.

The first bearing module and the first spring module can be axially coupled by way of the plurality of balls, for example. The first spring module can be designed as a spring ring having a running groove for the balls, for example. The first bearing module can have a ball raceway for the balls on the end side on the gearwheel.

For example, the first spring module can be specified in such a manner that it is deflectable under an axial load bearing thereon in such a manner that the gearwheel is in direct contact with the housing by way of an end face. As a result, the axial load bearing thereon can be transmitted to the housing directly by way of the gearwheel.

The invention herein proceeds from the concept that, in addition to the radial friction, the highest frictional forces arise axially between the gearwheel and the housing (axial force exceeding radial force) when such a gear unit is used for a longitudinal adjustment of a seat. In order to optimize the mounting of the gearwheel in the housing in particular with a view to axial loading, the invention as a bearing provides a resiliently mounted ball bearing, and thus a combination of a first bearing module and a first spring module. The advantages achieved by the invention are in particular that prevailing forces in the case of axial loads, for example in the event of a rear-end collision, are absorbed by the first spring module and dissipated into the housing. Moreover, rattling (so-called brinelling) due to the elastically, in particular resiliently, mounted ball bearing does not arise in the event of an overload, because the first spring module, in particular a spring disk or a spring ring, yields to such an extent before overloading occurs that the end faces of the gearwheel come into direct contact with the housing. In the event of an overload, the forces are thus dissipated directly into the housing and do not lead to lasting impression marks of the balls, which would cause rattling during adjustment. The bearing can comprise a set of balls or rollers.

Alternatively, the gear unit can comprise a second bearing assembly which is designed in such a manner that the gearwheel is supported axially as well as radially and mounted so as to be movable in relation to the housing. Such a second bearing assembly makes it impossible for the gearwheel to be laterally displaced. Minor tolerances in spacings between axes can be compensated for by such a second bearing assembly which supports the gearwheel radially and mounts it so as to be movable in relation to the housing, and quiet mounting of the rotatable gearwheel can be made possible.

For example, the second bearing assembly can comprise at least one friction bearing for radial support. The second bearing assembly for axial support can comprise a second bearing module and a second spring module, for example. Ball bearings, which in turn are kept play-free and permanently tensioned by way of second spring modules, in particular spring disks, irrespective of axial loads acting thereon, in particular loads in the direction of movement of the rail, are used axially on both sides of the gearwheel, in particular of an output gearwheel, for example, as second bearing modules.

The friction bearing can be disposed on at least one end of the gearwheel in such a manner that the gearwheel is supported radially and mounted so as to be movable in relation to the housing. For example, the friction bearing can be designed as a sliding bushing for absorbing radial loads. The friction bearing can be disposed as a plastic bearing bush in the housing, for example.

The second bearing module can be designed as a ball bearing, in particular an axial ball bearing, with balls. The second spring module can be designed as a spring disk or a spring ring. The second bearing module can be disposed between the friction bearing and the second spring module. The second bearing module can roll on the gearwheel on a running surface, in particular on an end side of the collar of the gearwheel, and on the second spring module can roll on a running surface.

The alternative second bearing device is in particular specified in such a manner that the radial support and movable mounting (also referred to as radial guiding function) of the gearwheel, and the axial support and movable mounting (also referred to as the axial guiding function) of the gearwheel, are designed separately from one another. The second bearing module, the second spring module and the friction bearing can preferably be designed as separate units. In other words: high axial forces (without generating high frictional momentums) as well as radial forces that arise (for required exact minor distances between axes for ideal rolling) can be adhered to by the alternative second bearing assembly. The second bearing assembly makes it possible that the radial forces, which are generated, for example, by reaction forces in the toothing of the gearwheel (for example due to tooth meshing angles and momentums acting thereon), as well as positional deviations of a spindle fixed in a lower rail relative to the housing which is movable in the vertical direction in an upper rail (also referred to as gearbox), for example, can be equalized without changing the distances between axes within the gear. The equalization of positional deviations of the spindle takes place by lifting or lowering the entire gear unit, the latter being movably mounted in the upper rail under pre-loading by rubber bearing shells.

The first bearing module or the second bearing module can comprise a ball set having a plurality of balls, which are in particular disposed in an annular manner, and a ball bearing for movably mounting the balls of the ball set. The balls of the ball set of the first bearing module can be coupled to a raceway of the gearwheel, on the one hand, and to the associated spring module, on the other hand. The balls of the ball set of the second bearing module can be coupled to a raceway or running surface of the gearwheel, on the one hand, and to a raceway or running surface directly on the housing, or to a raceway or running surface directly on the second spring module, on the other hand, and thus be coupled indirectly to the housing by way of the second spring module. The second spring module can be designed as, for example, a spring ring or a spring disk, in particular of plastics material or metal.

The first bearing module can in particular be designed as a tapered ball bearing.

The second bearing module can in particular be designed as an axial ball bearing.

The gear unit moreover comprises a drive wheel for the gear unit, in particular for the gearwheel. The gearwheel, in particular an output wheel, is coupled for movement directly to the drive wheel, or indirectly, in particular by way of an idler wheel or gearbox wheel. For mounting the gearwheel in the housing, either the first bearing assembly can be provided for the axially spring-elastic support and movable mounting, or the second bearing assembly can be provided for the axially spring-elastic and radial support and movable mounting. One first bearing assembly or one second bearing assembly can be provided herein for each gearwheel end.

A gear unit according to the invention is in particular designed as an axial gear, in particular a spur gear, having axes which are disposed vertically above one another and run in parallel, in particular axes of a drive axis (motor axis), an optional gear axis (idler wheel axis) and output axis (spindle axis). Such a gear unit which is designed as an axial gear can comprise the mounting of a gearwheel in the housing described above.

In a first exemplary embodiment, in particular a motor/gear assembly having a motor disposed in the longitudinal direction of the rails, the gear unit is designed as a spur gear, in particular a helical spur gear, and comprises a drive wheel having the drive axis, and an output wheel designed as a gearwheel, in particular a spindle nut, having the output axis, and a gearbox wheel which is designed as an idler wheel and is disposed between the drive wheel and the gearwheel.

In a second exemplary embodiment, in particular a motor/gear assembly having a motor which is disposed transversely to the rails, the gear unit is designed as a worm gear and comprises at least one drive wheel, designed as a worm wheel, having the drive axis, and an output wheel, designed as a gearwheel, in particular a spindle nut, having the output axis.

The gear unit is disposed in a common housing. The gearwheel designed as a spindle nut has an internal thread designed as a nut thread, and an external toothing, in particular a helical toothing, designed as an external nut profile. For example, the gearwheel designed as the output wheel has an external thread designed as a trapezoidal thread. The gearwheel is driven directly by the drive wheel, or optionally indirectly by way of the gearbox wheel.

In the gear unit designed as a spur gear having parallel axes, a motor, in particular an electric motor, for driving the drive wheel can be disposed partially within the seat rail or upper rail, or partially or complete outside the seat rail or upper rail. The motor can act on the gearwheel by way of the gear unit so as, by way of the gearwheel which is rotatable and longitudinally movable on the spindle (spindle nut on stationary spindle), to convert the movement of the motor shaft into a longitudinal adjustment of a vehicle seat. Alternatively, the invention can also be applied to a driven spindle.

In a longitudinal adjustment of the vehicle seat, the highest axial friction forces act between the gearwheel designed as a spindle nut and the housing. The first bearing module, in particular a tapered ball bearing, or the second bearing module, in particular an axial ball bearing, is primarily provided for reducing these axial frictional forces.

The respective bearing module is mounted so as to be axially elastic by the associated first spring module or second spring module. In the event of a one-sided load, the spring pre-loading ensures that the unstressed ball set always remains under tension. This helps in reducing or avoiding rattling noises and/or clattering noises. Such an axially spring-elastic mounting of the gearwheel in the common housing is formed, for example, from first or second spring modules which are in each case disposed on one end, in particular on each end, of the gearwheel, between the latter and the housing, in combination with the first or the second bearing modules.

One refinement provides that the motor, in particular an electric motor, and the gear unit are disposed on a front end or rear end of the seat rail, and/or the motor, in particular an electric motor, and the gear unit are disposed so as to run through a clearance, so as to be at least partially in the cavity formed between the seat rail and the floor rail.

The geared motor according to the invention comprises at least one motor having a motor shaft and the gear unit described above having the improved mounting of the gearwheel and/or having the improved disposal of the axes vertically above one another, wherein the drive wheel is coupled, or able to be coupled, directly or indirectly to the motor shaft, and the gearwheel is coupled, or able to be coupled, directly or indirectly to the drive wheel and directly to the spindle.

For example, the gearwheel, in particular the spindle nut, of the gear unit has an external toothing. The gearwheel is, for example, a spur gear or a cylinder gear having a cylindrical external contour and the external toothing, in particular a helical toothing, on its circumference. A drive wheel disposed on the motor shaft has a corresponding external toothing, in particular a helical toothing, which is operatively connected directly to the external toothing of the gearwheel, or indirectly, in particular by way of an intervening gearbox wheel. The gearwheel is an output wheel. The gearwheel (also referred to as the spindle nut), is operatively connected to a spindle of a longitudinal adjuster for a vehicle seat. For example, the gearwheel has an internal thread, and the spindle has a corresponding external thread.

The longitudinal adjuster comprises, for example, a pair of rails which has a seat rail, which is in particular connectable to the vehicle seat, and a floor rail, which is in particular connectable to a vehicle floor and on which the seat rail is displaceably guided. Moreover, the longitudinal adjuster as a drive device comprises the geared motor for adjusting the seat rail relative to the floor rail. The geared motor comprises the motor and the gear unit described above. For example, the spindle on which the gearwheel designed as the spindle nut rotates and for longitudinal adjustment runs along the spindle axis on the spindle is designed to be stationary. The spindle axis of the spindle and the axis (also referred to as output axis) of the gearwheel designed as a spindle nut herein form a common axis. As a result, longitudinal adjusters are easier and more economical to produce.

In one exemplary embodiment, the motor shaft, a rotation axis of an idler wheel or a gear axis of a gearbox wheel and the spindle axis can be disposed vertically above one another. In particular, the drive axis of the motor shaft, the gear axis and the output axis, designed as a common axis of the gearwheel and the spindle, are disposed so as to be above one another and run parallel in a vertical plane.

For example, the gear unit designed as a spur gear has a drive wheel coupled to the motor shaft, an optional gearbox wheel as an intermediate wheel or idler wheel, and an output wheel as a gearwheel. The drive wheel, the gearbox wheel, and the output wheel are disposed vertically above one another and so as to be mutually parallel, the axes thereof running in particular so as to be mutually parallel. The drive wheel and the output wheel of the gear unit herein are operatively connected to one another, in particular mesh with one another, directly or indirectly by way of the idler wheel, in particular a gearbox wheel.

The gear unit preferably has a rotating output wheel (=rotating spindle nut) as the gearwheel. The core concept of the present invention lies in the mounting of the rotating spindle nut. The gear unit herein has helically toothed spur gears or helically toothed cylinder wheels having axes which are disposed vertically above one another and run in parallel. In this exemplary embodiment, the motor axis can be disposed so as not to be co-aligned.

The geared motor described above, having the motor and the gear unit in the various embodiments described above, are particularly suitable for use in a longitudinal adjuster for a vehicle seat, in particular a motor vehicle seat.

Before design embodiments of the invention will be described in more detail hereunder by the drawings, it is first to be noted that the invention is not limited to the components described, or the method steps described. Furthermore, the terminology used also does not represent any limitation but is merely exemplary in character.

DESCRIPTION OF THE FIGURES

Exemplary embodiments of the invention will be explained in more detail hereunder by figures. However, the invention is not limited to these exemplary embodiments. Furthermore, the terminology used does not represent any limitation but is merely exemplary in character. In is far as the singular used hereunder in the description and the claims, the plural is in each case also included unless this is explicitly precluded by the context. In the figures:

DETAILED DESCRIPTION

Equivalent parts are provided with the same reference signs in all figures.

Figure 1:
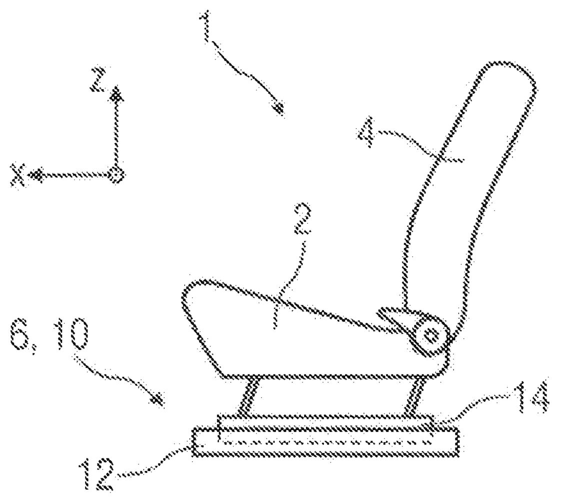
FIG. 1 schematically shows a vehicle seat according to the invention having a longitudinal adjuster according to the invention.

A vehicle seat 1, schematically illustrated in FIG. 1, is described hereunder while using three spatial directions running perpendicularly to one another. A longitudinal direction X in a vehicle seat 1 installed in the vehicle runs largely horizontal and preferably parallel to a vehicle longitudinal direction which corresponds to the usual direction of travel of the vehicle. A transverse direction Y, which runs perpendicularly to the longitudinal direction X, is likewise horizontally aligned in the vehicle and runs parallel to a vehicle transverse direction. A vertical direction Z runs perpendicularly to the longitudinal direction X and perpendicularly to the transverse direction Y. In a vehicle seat 1 installed in the vehicle, the vertical direction Z runs parallel to the vehicle height axis.

The positional indications and directional indications used such as, for example, front, rear, top and bottom refer to a viewing direction of a passenger sitting in a normal seated position in a vehicle seat 1, wherein the vehicle seat 1 is installed in the vehicle, and is in a use position suitable for transporting passengers, with an upright backrest 4, and is aligned as is customary in the direction of travel. However, a vehicle seat 1 according to the invention may also be installed in an alignment deviating therefrom, for example transversely to the direction of travel.

The vehicle seat 1 has a seat part 2, and the backrest 4 which in terms of its rake is adjustable relative to the seat part 2 and is pivotable toward the front in the direction of the seat part 2.

The vehicle seat 1 has a longitudinal adjuster 6 for attaching the vehicle seat 1 so as to be longitudinally displaceable and longitudinally adjustable in the vehicle. The longitudinal adjuster 6 comprises a pair of rails 10 which has a seat rail 4 connectable to the vehicle seat 1, and a floor rail 12 which is connectable to a vehicle floor and on which the seat rail 14 is displaceably guided.

Figure 2:
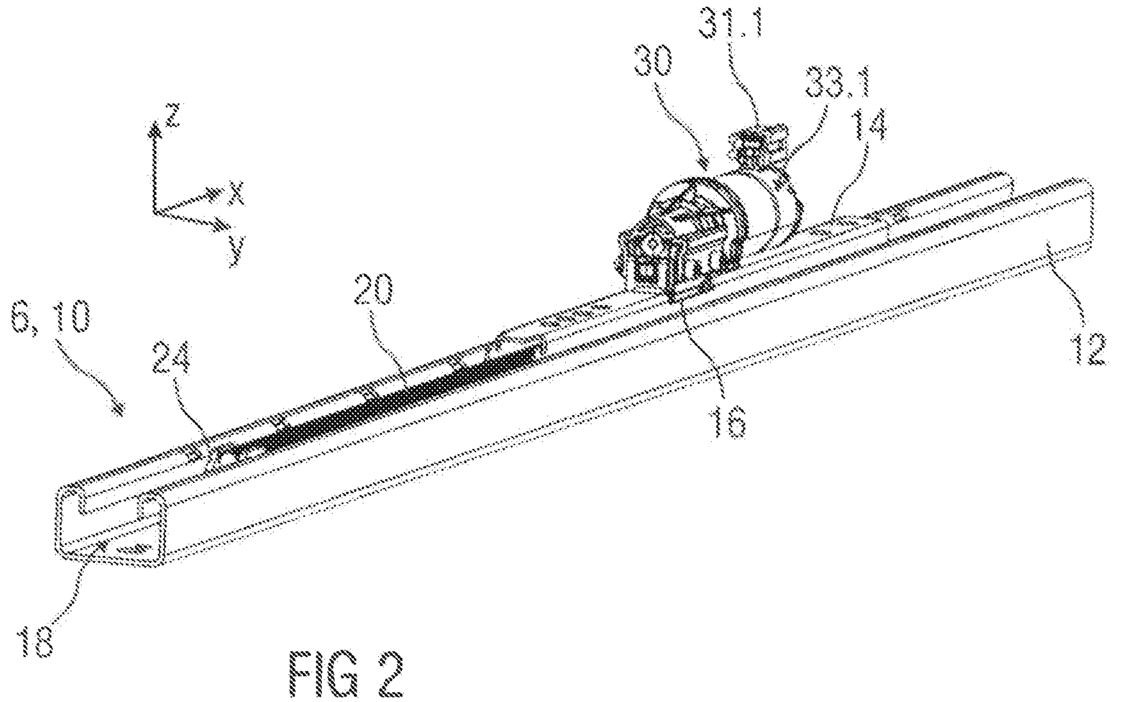
FIG. 2 shows a perspective illustration of the longitudinal adjuster according to the invention.
Figure 3:
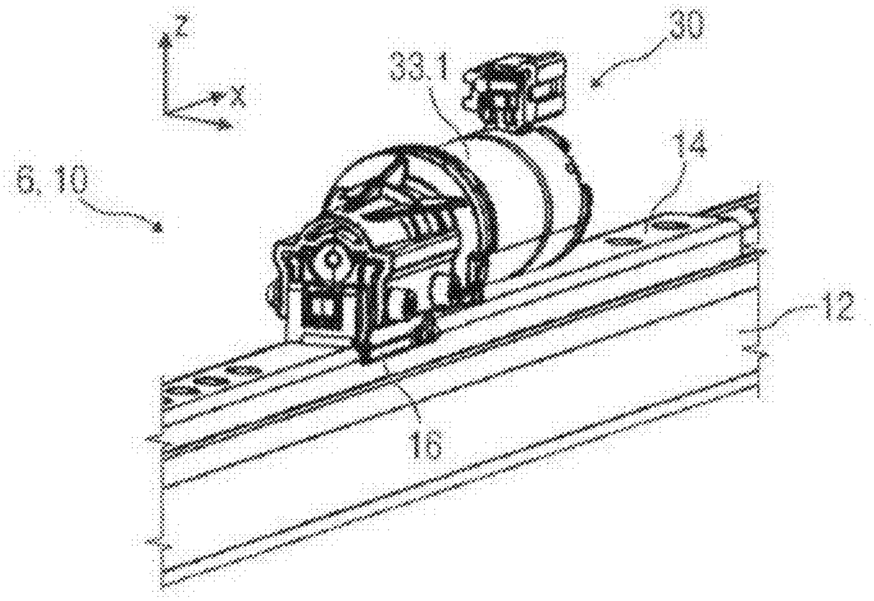
FIG. 3 shows in fragments a perspective view onto an end of the longitudinal adjuster of FIG. 2.

FIGS. 2 to 3 show the longitudinal adjuster 6. The vehicle seat 1 preferably has two longitudinal adjusters 6 of identical construction.

Figure 4:
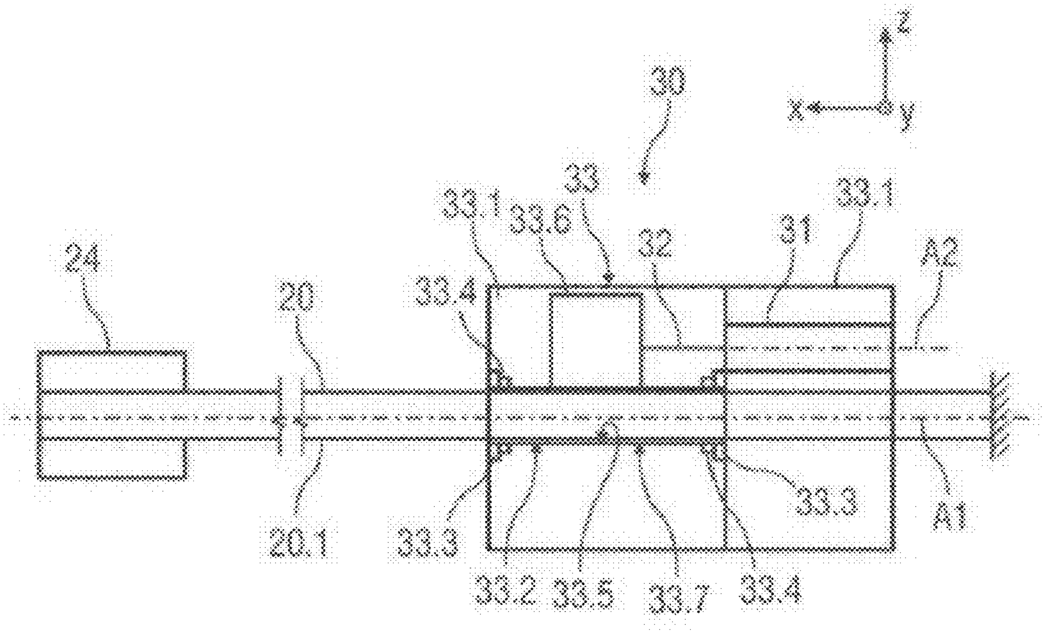
FIG. 4 schematically shows a geared motor according to the invention in a longitudinal sectional view.

The longitudinal adjuster 6 serves for longitudinal adjustment, i.e. adjusting a longitudinal seat position of the vehicle seat 1. The vehicle seat 1 preferably has in each case one longitudinal adjuster 6 on each side of the vehicle seat. One longitudinal adjuster 6 is disposed on a tunnel side, and the other longitudinal adjuster 6 is disposed on a door sill side. The two longitudinal adjusters 6 of the vehicle seat 1 run so as to be mutually parallel. Each longitudinal adjuster 6 has one pair of rails 10 having a floor rail 12 connectable to a vehicle floor, and having a seat rail 14 which is guided by said floor rail 12 and is connectable to the vehicle seat 1. The two longitudinal adjusters 6 can be mutually adjustable in a synchronized, in particular an electronic, manner. Each longitudinal adjuster 6 possesses an associated motor 31 (as is illustrated in FIG. 4). Only one of the two longitudinal adjusters 6 of identical construction is described hereunder.

The longitudinal adjuster 6 has a drive device for adjusting the seat rail 14 relative to the floor rail 12. The drive device has a geared motor 30. An interface 31.1 for connecting to a power supply is disposed on the geared motor 30.

The geared motor 30 is at least partially disposed in a cavity 18 formed between the seat rail 14 and the floor rail 12. The geared motor 30, in particular a housing 33.1 of the geared motor 30, presently protrudes in portions through a clearance 16 in the seat rail 14 and in the vertical direction Z upward from the latter, or through the latter. The geared motor 30 is presently attached to an end region of the seat rail 14.

Alternatively, the geared motor 30 can be disposed outside the seat rail 14.

Figure 5:
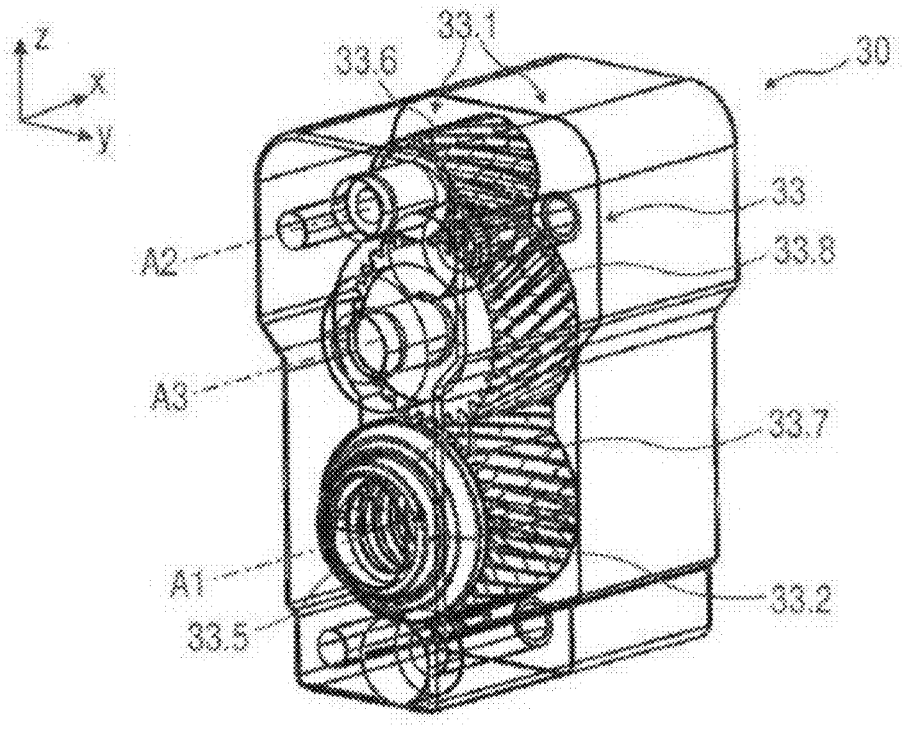
FIG. 5 schematically shows a first embodiment of a gear unit according to the invention having a geared motor in a perspective illustration.
Figure 6:
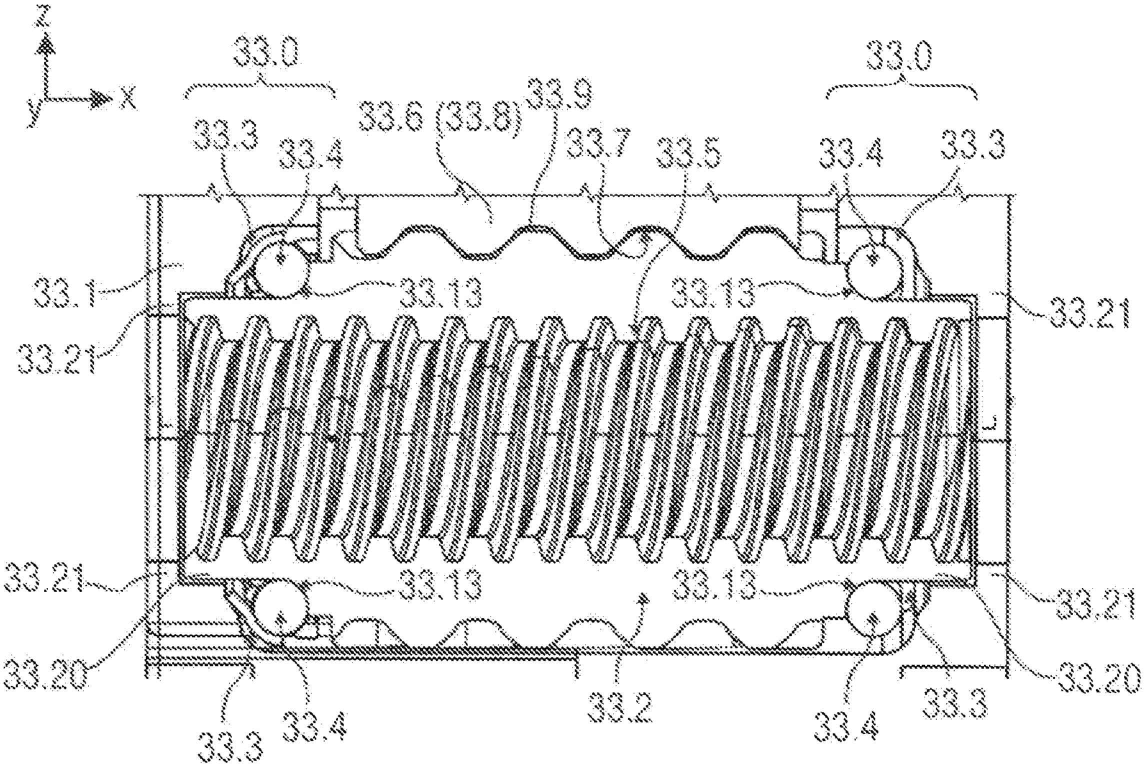
FIG. 6 shows in fragments a first embodiment of the gear unit according to the invention having a first bearing assembly in a longitudinal sectional view.

The geared motor 30 can be partially disposed in a cavity 18 formed between the seat rail 14 and the floor rail 12. The geared motor 30 is in particular connectable to the seat rail 14, in particular connectable in a materially integral or form-fitting manner, so as to be able to transmit high forces. The geared motor 30 comprises the motor 31 and the gear unit 33, as is illustrated in FIGS. 5 and 6. The motor 31 and the gear unit 33 thus form a unit. The motor 31 and the gear unit 33 are disposed in a common housing, i.e. the housing 33.1.

The longitudinal adjuster 6 comprises a spindle 20 which is illustrated in FIG. 2. A spindle block or a spindle holder 24 can optionally be provided for supporting the spindle 20. The spindle 20 is stationary.

The spindle 20 is operatively connected to the geared motor 30, as will be described in more detail hereunder:

FIG. 4 schematically shows the geared motor 30 having the gear unit 33 in a longitudinal sectional view and in a diagrammatic illustration.

FIG. 5 shows the gear unit 33 of the geared motor 30 having the housing 33.1, and without the motor 31, in a perspective view. The housing 33.1 is illustrated so as to be partially transparent in the region of the gear unit 33.

FIG. 6 schematically shows the gear unit 33 of the geared motor 30 in a longitudinal sectional view.

The geared motor 30 of FIGS. 4 to 6 will be described in detail hereunder.

The geared motor 30 comprises at least the motor 31 having a motor shaft 32 (as shown in FIG. 4) and the gear unit 33. The motor 31 and the gear unit 33 are operatively connected to one another.

The gear unit 33 according to the first exemplary embodiment as per FIGS. 6 to 9 comprises at least one housing 33.1, a gearwheel 33.2 designed as a spindle nut, and a first bearing assembly 33.0.

The first bearing assembly 33.0 comprises two spring modules 33.3 and two bearing modules 33.4. The first bearing assembly 33.0 supports the gearwheel 33.2 at both its ends in an axially spring-elastic manner in relation to the housing 33.1. The motor 31 can be disposed in the housing 33.1. Alternatively, there may be separate housing parts.

The gear unit 33 can be connectable, preferably connectable in a form-fitting manner, to the seat rail 14 so as to enable acoustic decoupling by way of the elastic elements such as, for example, rubber elements.

The gearwheel 33.2 of the gear unit 33 is coupled, or able to be coupled, to the spindle 20 of the longitudinal adjuster 6. The spindle 20 has an external thread 20.1, in particular a trapezoidal thread. The gearwheel 33.2 of the gear unit 33 has an internal thread 33.5 which corresponds to the external thread 20.1. The external thread 20.1 of the spindle 20 is operatively connected to the internal thread 33.5 of the gearwheel 33.2. The spindle 20 is stationary. The gearwheel 33.2 designed as a spindle nut rotates and runs along the spindle 20 for longitudinally adjusting the vehicle seat 1.

The gear unit 33 can have a drive wheel 33.6, which is directly coupled to the motor shaft 32. The drive wheel 33.6 is in particular designed as a helically toothed spur gear and rotatably mounted.

The gear unit 33 has the gearwheel 33.2 as the output wheel. The gearwheel 33.2 is designed, for example, as a spindle nut which is coupled to the spindle 20 and has an external nut profile 33.7, in particular a helical toothing.

The gear unit 33 is designed as a spur gear or axial gear, in particular a two-wheel axial gear or a three-wheel axial gear.

As is illustrated by way of example in FIG. 5, the axial gear comprises at least the drive wheel 33.6 having a second axis A2, designed as drive axis, and an output wheel which is designed as the gearwheel 33.2, in particular a spindle nut, having a first axis A1 designed as output axis, and optionally a gearbox wheel 33.8 which is designed as an idler wheel and has a third axis A3 designed as a gear axis. The idler wheel or gearbox wheel 33.8 is disposed between the drive wheel 33.6 and the gearwheel 33.2. The optional idler wheel is used in particular when a high-output motor 31 cannot be accommodated on the seat rail 14, and the spacing from the spindle 20 is enlarged as a result. The axial gear is disposed in the common housing 33.1.

The drive wheel 33.6 and the gearwheel 33.2 designed as output wheel and spindle nut are disposed vertically above one another and run so as to be mutually parallel; in particular, the axes A1 and A2 and A3 thereof run so as to be mutually parallel. In the exemplary embodiment as per FIG. 4, the drive wheel 33.6 and the gearwheel 33.2 of the gear unit 33 are operatively connected directly to one another.

A first axis A1 is a common axis of the spindle 20 and of the gearwheel 33.2. This first axis A1 is also referred to as spindle axis or output axis. A second axis A2 corresponds to the axis of the drive wheel 33.6. This second axis A2 is also referred to as motor axis or drive axis.

In the exemplary embodiment as per FIG. 5, the drive wheel 33.6 and the gearwheel 33.2 of the gear unit 33 are operatively connected to one another, in particular mesh with one another, indirectly by way of a further gearbox wheel 33.8, in particular an idler wheel.

The geared motor 30 with the motor 31 and the gear unit 33 are particularly suitable for use in the longitudinal adjuster 6 for the vehicle seat 1, in particular a motor vehicle seat, as described above in more detail by FIGS. 1 to 3.

The gear unit 33 is at least partially disposed in the cavity 18 formed between the seat rail 14 and the floor rail 12. The housing 33.1 of the gear unit 33 can in portions protrude in the vertical direction Z upward through the clearance 16 in the seat rail 14. The motor 31 can in portions protrude parallel to the longitudinal direction X from a central region of the seat rail 14. The motor 31 can be positioned in front of or behind the gear unit 33.

The motor 31 and the gear unit 33 can be attached, in particular conjointly, in the central region of the seat rail 14. The motor 31 and the gear unit 33 can be embodied as a geared motor 30 having the common housing 33.1, as is shown in FIG. 5.

The gear unit 33 is in particular designed as a spur gear with a low gear ratio, in order to optimize the size of the motor and to produce the geared motor 30 in a cost-effective manner.

The gear unit 33 can convert a rotating speed of the drive wheel 33.6 at a positive ratio into a rotating speed of the output wheel, in particular of the gearwheel 33.2 directly, or indirectly by way of the gearbox wheel 33.8. The gear unit 33 can convert a rotating speed of the drive wheel 33.6 at a negative ratio into a rotating speed of the gearwheel 33.2 directly, or indirectly by way of the gearbox wheel 33.8.

FIG. 6 shows in fragments the first embodiment of the gear unit 33 according to the invention having the first bearing assembly 33.0 in a longitudinal sectional view in the region of a mounting for the gearwheel 33.2, designed as output wheel, without the stationary spindle 20. Such a mounting can also be used in a rotating spindle (not illustrated), if the spindle is connected to the output wheel, i.e. the gearwheel 33.2, so as to be secured against rotating out of position in the geared motor not illustrated.

The gearwheel 33.2 has the internal thread 33.5 for coupling to the spindle 20, and the external nut profile 33.7, in particular a helical toothing, for coupling to the gearbox wheel 33.8 (as is illustrated in FIG. 5), or directly to the drive wheel 33.6 (as illustrated here in FIG. 6 and in FIG. 4). The gearbox wheel 33.8 or the drive wheel 33.6 has an external profile 33.9, in particular a corresponding helical toothing, which corresponds to the external nut profile 33.7.

The gear unit 33 on each end of the gearwheel 33.2 has the associated first bearing assembly 33.0, comprising on each end the associated first bearing module 33.4 and the first spring module 33.3.

In order to optimize the mounting of the gearwheel 33.2 in the housing 33.1, in particular with a view to axial stress, the respective first bearing module 33.4 is coupled to the first spring module 33.3. The respective first bearing module 33.4 and the first spring module 33.3 in the assembled state form a resiliently mounted bearing (illustrated in FIGS. 6 and 7) for the gearwheel 33.2. A resiliently mounted bearing is understood to mean in particular a spring pre-loaded mounting of a plurality of balls 33.11. Other elements such as, for example rollers, may also be provided instead of balls 33.11.

Figure 7:
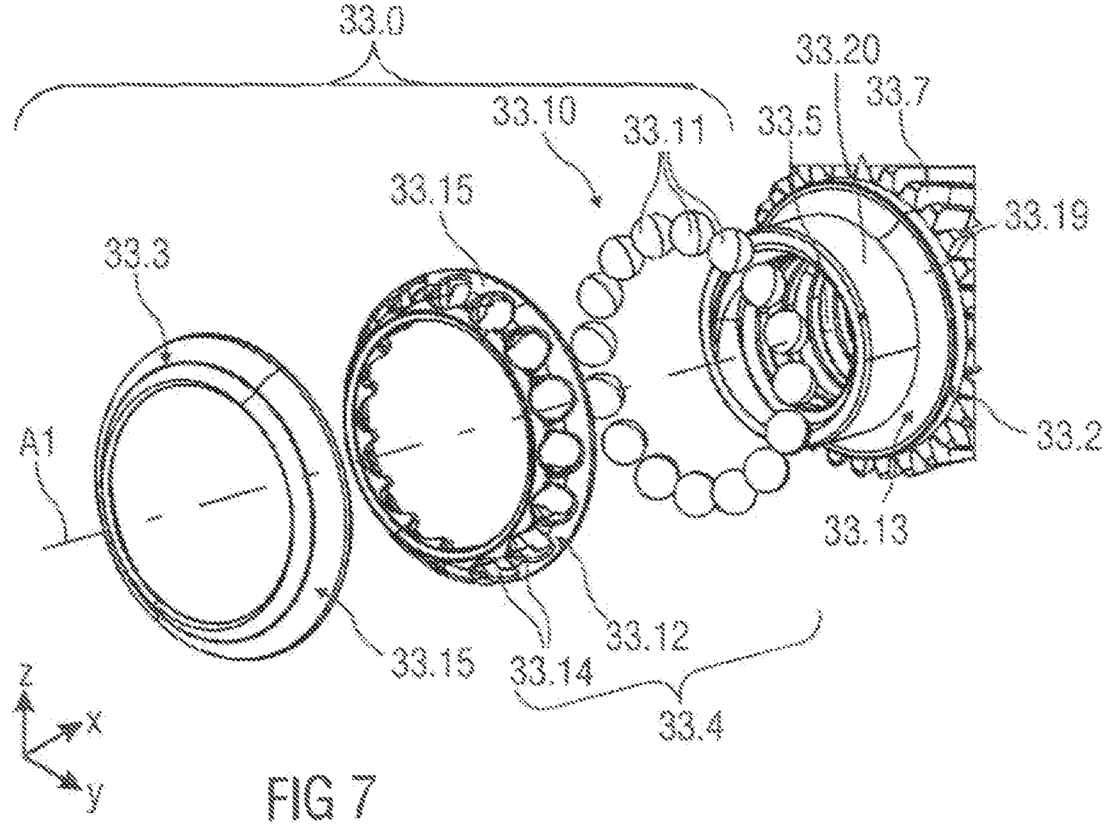
FIG. 7 shows in fragments a mounting of the gearwheel of the gear unit of FIG. 6 in an exploded illustration.

FIG. 7 shows the first bearing assembly 33.0 as a resiliently mounted bearing for the gearwheel 33.2 in an exploded illustration.

The gear unit 33 is designed as a spur gear, in particular a helically toothed spur gear. The gearwheel 33.2 is supported so as to be pre-loaded on the housing 33.1 by the first bearing module 33.4 and by the first spring module 33.3.

The respective first bearing module 33.4 comprises a ball set 33.10 having a plurality of, in particular annularly disposed, balls 33.11, and a bearing 33.12 for movably mounting the balls 33.11. The balls 33.11 are coupled to a ball raceway 33.13 of the gearwheel 33.2 and to the associated first spring module 33.3.

The bearing 33.12 is designed as a ball bearing ring 33.15 and is provided with a number of through-openings 33.14 corresponding to the number of balls 33.11.

The first bearing module 33.4, in particular the bearing 33.12, is designed as a tapered ball bearing. For this purpose, the bearing 33.12 has a ball bearing ring 33.15 which runs obliquely to the axis A1. The balls 33.11 here are disposed in the ball bearing ring 33.15 in such a manner that they can absorb forces of which the line of action does not run perpendicularly to the axis A1, but obliquely, at a specific angle, to the horizontal axis A1. In other words: the contact angles of the balls 33.11 are inclined toward the gearwheel 33.2 and the ball bearing ring 33.15 of the first bearing module 33.4 in relation to the axis A1. Accordingly, an opening plane of the through-openings 33.14 runs obliquely to the axis A1. For example, the ball bearing ring 33.15 is inclined toward the axis A1 at an angle in a range from 30° to 60°, preferably of 45°.

The respective first spring module 33.3 is designed as a spring disk or a spring ring having a running groove 33.16

(illustrated in FIG. 8) for the balls 33.11. The running groove 33.16 has in particular a groove shape that corresponds to the surface of the balls 33.11. Alternatively, the running groove 33.16 may have a larger radius in order to minimize friction loss.

The balls 33.11 of the respective ball bearing ring 33.15 are mounted directly on the ball raceways 33.13 of the gearwheel 33.2, on the one hand. The ball raceways 33.13 are formed at the transition from a step 33.19 from the collar 33.20 to the external nut profile 33.7. In particular, the ball raceways 33.13 are in each case formed on the end side on the step 33.19 to the external nut profile 33.7. On the other hand, the balls 33.11 run in the respective first spring module 33.3, in particular in the running grooves 33.16 of the respective first spring module 33.3. For this purpose, the first spring modules 33.3, designed as spring disks or spring rings, have correspondingly shaped ball raceways as running grooves 33.16. These first spring modules 33.3, in particular spring disks or spring rings, are supported on the housing 33.1, as is shown in detail in FIGS. 7 and 9.

In the assembled state, the first spring modules 33.3 are tensioned and ensure smooth running of the gearwheel 33.2 in the housing 33.1, in particular without axial play.

In the event of overload, in particular in the event of axial forces that act on the gear unit 33 due to a rear-end collision, these axial forces are absorbed by the first spring modules 33.3. The respective first spring module 33.3 herein is specified in such a manner, in particular designed to be elastic or yielding in such a manner, that the end face of the gearwheel 33.2 comes into contact with the housing 33.1 by way of the first spring module 33.3. In this way, the forces in the event of an overload can be dissipated into the housing 33.1. As a result, damage to the gear unit 33 can be reduced or even avoided.

Additionally, ball imprints and rattling resulting from the ball imprints (so-called brinelling) can be avoided, because the respective first spring module 33.3 prior to the overload arising, is specified in such a manner, in particular is elastic or yielding in such a manner, that the end face of the gearwheel 33.2 comes into direct contact with the housing 33.1. The spring forces herein are conceived in such a way that an axially projecting collar 33.20 of the gearwheel 33.2 never comes into contact with the housing 32 when the vehicle seat 100 is adjusted by maximum forces, for example caused by the seat weight, passenger weight or user weight, for example rail adjustment forces and/or slope gradient forces. The longitudinal adjuster 6 is thus particularly efficient.

For example, the gearwheel 33.2 on its frontal ends has a collar 33.20 (as illustrated in FIGS. 6 and 7). The first spring module 33.3 and the first bearing module 33.4 are disposed on the collar 33.20. The collar 33.20 can be of such a length that the former protrudes from the first spring module 33.2 and the first bearing module 33.4 (as shown in FIG. 6). This protruding end of the collar 33.20 can be disposed directly opposite a housing portion 33.21.

In the event of an overload, the forces can thus be dissipated into the housing 33.1 directly on the housing portion 33.21. In this way, permanently undesirable marks on the ball raceways 33.12 of the gearwheel 33.2, and unsteady running and annoying noises are thus avoided.

Moreover, owing to the gearwheel bearing being designed as the bearing 33.12, radial and axial forces, in particular friction forces, caused by the vehicle seat 1 to be displaced, can be reduced. As a result, the efficiency of the gear unit 33 can be increased to 19% to 20% in comparison to known gear units.

In other words: The gearwheel 33.2 is supported in an axially spring-elastic manner in relation to the housing 33.1 by the first bearing module 33.4, or the first bearing modules 33.4, in combination with the first spring module 33.3, or the first spring modules 33.3. In particular, the gearwheel 33.2 is disposed in the housing 33.1 so as to be pre-loaded, in particular in an axially spring-elastic manner, by the first spring module 33.3, or the first spring modules 33.3, and is mounted so as to be optimized for friction by the first bearing module 33.4, or the first bearing modules 33.4. The first spring module 33.3, or the first spring modules 33.3, are specified in such a manner, for example, that a corresponding spring force acts on the gearwheel 33.2 by way of the first bearing module 33.4, or the first bearing modules 33.4, on the one hand, and the gearwheel 33.2 is supported and mounted on the housing 33.1 in an axially spring-elastic manner by way of the first bearing module 33.4, or the first bearing modules 33.4, and the first spring module 33.3, or the first spring modules 33.3, on the other hand.

Figure 8:
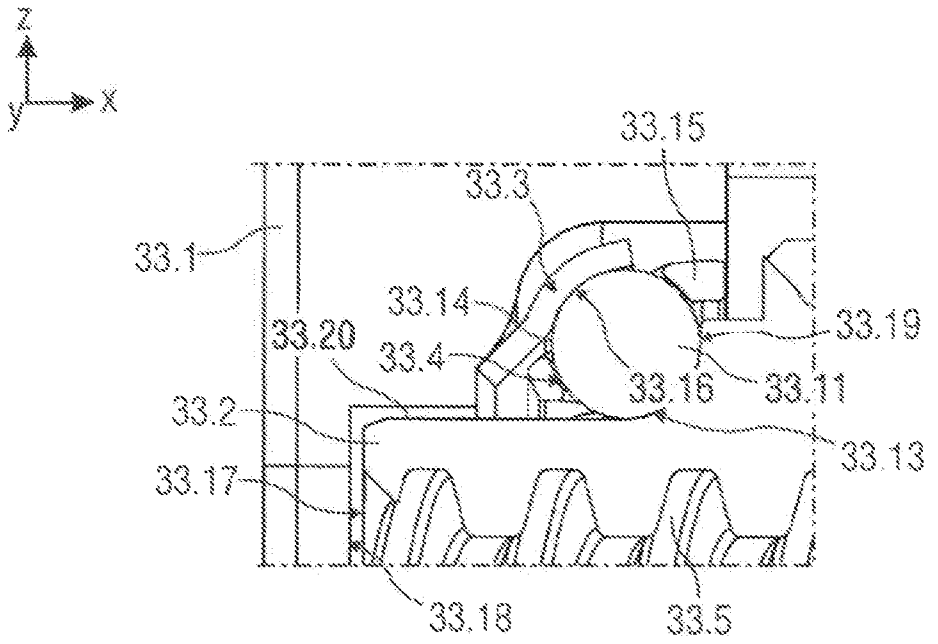
FIG. 8 shows in fragments the gear unit of FIG. 6 in the region of a first ball bearing in a longitudinal sectional view.

FIG. 8 shows in fractions the gear unit 33 of FIG. 5 in the region of the bearing 33.12 in a longitudinal sectional view.

Because the steel of the gearwheel 33.2 does not have the hardness of bearings 33.12 for cost reasons, for the avoidance of impression marks or rattling the invention provides the elastic, in particular spring pre-loaded, mounting of the gearwheel 33.2 by the first spring modules 33.3 in combination with the first bearing modules 33.4, as described above.

In the event of a high axial load, in particular in the event of an accident and when the adjustment is not in use, the first spring module 33.3, designed as a spring disk, for example, is deflected in such a manner that the gearwheel 33.2 comes into contact with the housing 33.1, in particular a housing internal face 33.18, directly on the housing portion 33.21 by way of an end face 33.17. In this way, the gearwheel 33.2 is elastically supported on the housing 33.1 in a simple manner before marks are formed on the ball raceway 33.13. Permanent marks on the ball raceways 33.12 are prevented and smooth running is enabled in this way.

Figure 9:
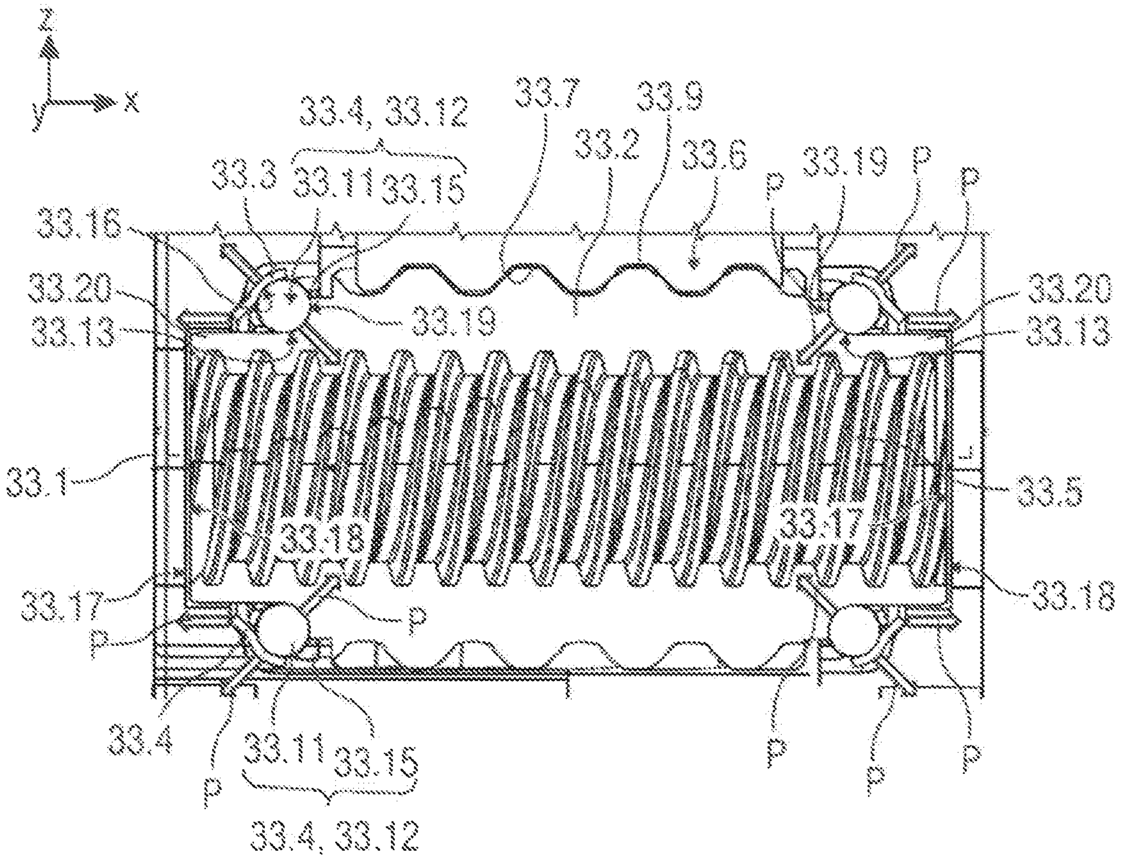
FIG. 9 shows in fragments a sectional illustration in the region of the gearwheel of the first embodiment of the gear unit, having a superimposed diagram of an active principle.

FIG. 9 shows in fragments a sectional illustration in the region of the gearwheel 33.2 of the gear unit 33 with a superimposed diagram of an active principle of the spring modules 33.3.

The respective spring module 33.3, in particular a spring disk or a spring ring, cause normal forces according to arrows P. The gearwheel 33.2 is held in position by way of the bearings 33.12, in particular tapered ball bearings. Contact with the housing 33.1 is avoided with the exception of the event of overload. In this way, the gearwheel 33.2 is held and mounted so as to be spaced apart from the housing 33.1 during normal operation.

Figure 10:
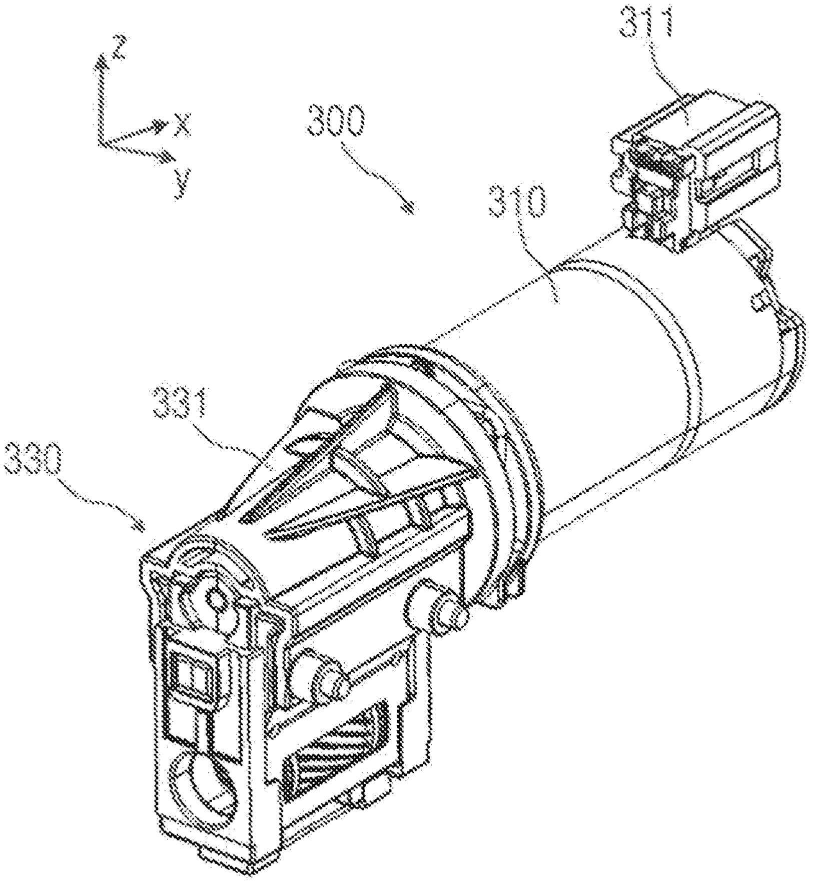
FIG. 10 schematically shows a geared motor according to the invention in a perspective illustration.

FIG. 10 schematically shows a second embodiment of a geared motor 300 according to the invention in a perspective illustration. The geared motor 300 is a vertical drive according to FIG. 5, having gearwheels disposed vertically above one another. An interface 311 for connecting to a power supply is disposed on the geared motor 300, in particular in the region of the motor 310.

The geared motor 300 as per FIGS. 10 to 13 differs from the geared motor 30 as per FIGS. 6 to 9 in terms of the gear unit 33, or 330, respectively, in particular in terms of the respective bearing assembly 33.0, or 330.0, respectively, for an alternative second gearwheel 332. The second gearwheel 332 differs from the gearwheel 33.2 only in terms of the type of mounting in the housing 331. The differences will be described in more detail hereunder, and thus the alternative gear unit 330 and the alternative mounting will be described in detail.

Both geared motors 30 and 300 are conceived for a stationary or fixed spindle 20. Such geared motors 30 and 300 are distinguished by high adjustment speeds and low gear ratios. The housing 33.1 or 331 of the geared motor 30, or 300, respectively, is disposed with a parallel axial orientation above or outside the upper rail.

The geared motor 300 comprises the alternative gear unit 330 and a motor 310 which is coupled to this alternative gear unit 330. The gear unit 330 is disposed in the housing 331. The motor 310 by way of its housing is coupled to the housing 331 of the gear unit 330. The motor 310 and the gear unit 330 can also be disposed in a common housing (not illustrated).

Figure 11:
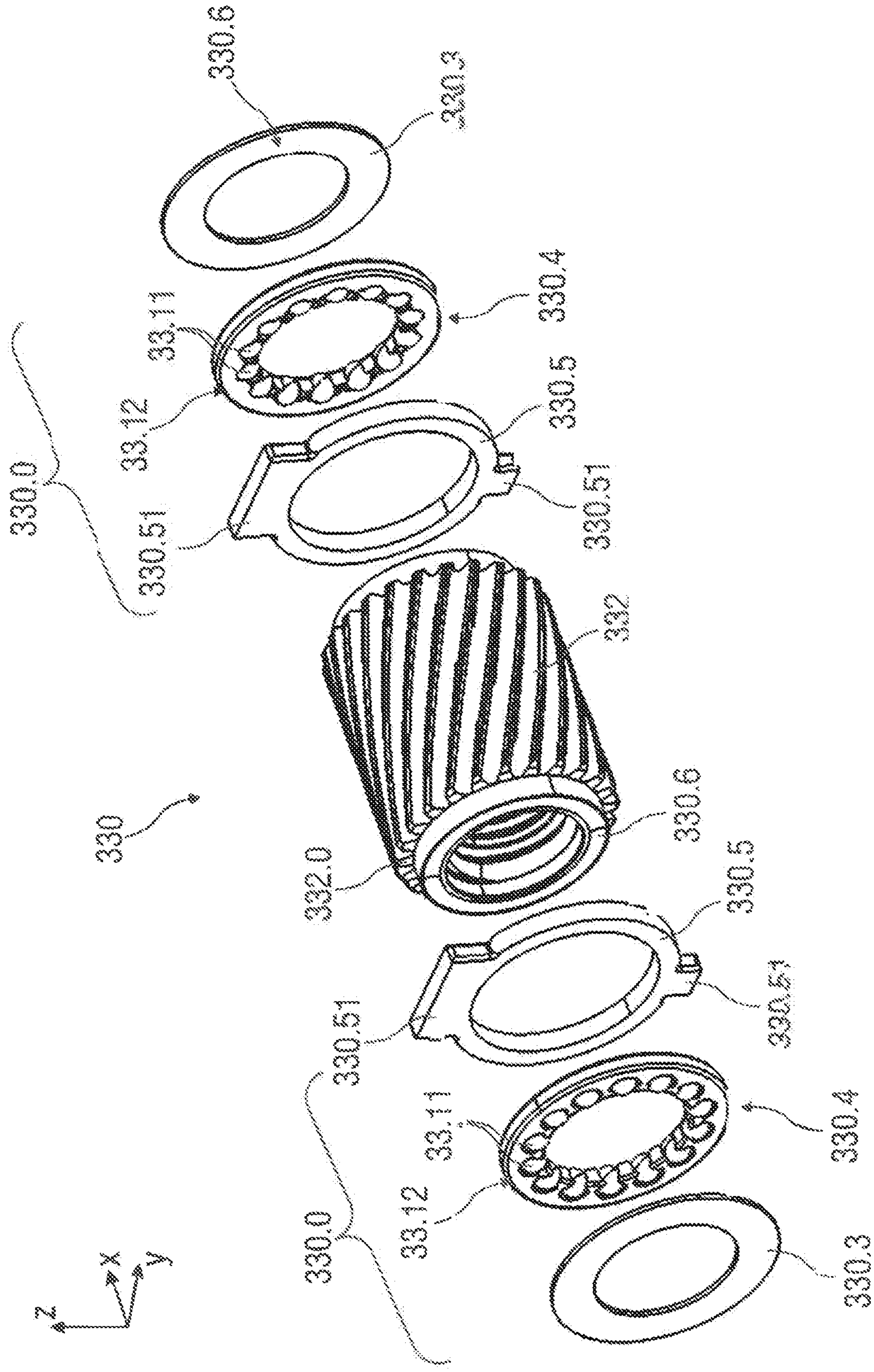
FIG. 11 schematically shows an exploded illustration of a second embodiment of a gear unit according to the invention having a second bearing assembly.

FIG. 11 schematically shows an exploded illustration of the second embodiment of the gear unit 330 according to the invention having a second bearing assembly 330.0.

The gearwheel 332 can be supported axially as well as radially and mounted so as to be movable in relation to the housing 331 (illustrated in FIG. 10) by the second bearing assembly 330.0. This second bearing assembly 330.0 prevents the gearwheel 332 being able to be laterally displaced. Minor tolerances in the distance of axes can be adhered to by the second bearing assembly 330.0, so as to enable smooth mounting of the rotatable gearwheel 332.

The second bearing assembly 330.0 is provided on each end of the gearwheel 332. The second bearing assembly 330.0 on each end of the gearwheel 332 comprises in each case one friction bearing 330.5 for radially supporting the gearwheel 332 in the housing 331 (illustrated in FIG. 13).

The gearwheel 332, designed as output gearwheel, is held radial in position on both sides by way of the friction bearings 330.5, for example plastics bearing bushings. These friction bearings 330.5 are fixed in the housing 301. In particular, the friction bearings 330.5 are secured against rotation and axial displacement by the extensions 330.51 (illustrated in FIG. 11). It is ensured in this way that no contact can arise between the rotating toothing and the stationary plastic bushing of the friction bearing 330.5. Only the planar contact between the collar 332.0 (also referred to as bearing cylinder) and the friction bearing 330.5 (also referred to as bushing) is permitted.

Significantly higher forces act axially than radially, which is why the bearings 33.12 are used the second bearing modules 330.4 for enhancing the overall drive efficiency.

For example, the second bearing assembly 330.0 for axial support comprises a second bearing module 330.4 and a second spring module 330.3 on both sides on each end of the gearwheel 332. In axial terms, in each case one axial ball bearing is used on both sides of the gearwheel 332, in particular of the output gearwheel, as the second bearing module 330.4, which is in each case in turn held free of play and always tensioned by way of the second spring module 330.3, in particular spring disks, irrespective of axial loads acting thereon, in particular loads in the direction of movement of the seat rail 14 of the longitudinal adjuster 6 (illustrated in FIG. 1).

The friction bearing 330.5 can be disposed on at least one end of the gearwheel 332 in such a manner that the gearwheel 332 is supported radially and mounted so as to be movable in relation to the housing 331. For example, the friction bearing 330.5 can be designed as a sliding bushing or a sliding ring or a sliding disk for absorbing radial loads. For example, the friction bearing 330.5 can be disposed as a plastics bearing bushing in the housing 331.

The friction bearing 330.5 can have extensions 330.51 which project on the outer circumference. The extensions 330.51 serve for fixing the friction bearing 330.5 in the housing 331, the latter having corresponding receptacles not illustrated in more detail. This axial fixing of the friction bearing position avoids contact with the rotating gearwheel 332. As a result, wear and friction losses can be reduced. The friction bearing 330.5 can be made of plastics material or metal such as, for example, brass, sintered metals with oil, and the like.

The second bearing module 330.4 can be designed as a bearing 33.12, in particular an axial ball bearing, with balls 33.11.

The second spring module 330.3 can be designed as a spring disk or a spring ring.

The second bearing module 330.4 can be disposed between the friction bearing 330.5 and the second spring module 330.3. The second bearing module 330.4 can be disposed between the gearwheel 332, in particular between the collar 332.0, and the second spring module 330.3. The second bearing module 330.4 can roll directly on the gearwheel 332 on a running surface 330.6 that faces the second bearing module 330.4, in particular on an axial groove or axial notch on the end side of the collar 332.0, and on the second spring module 330.3 on a running surface 330.6 that faces the second bearing module 330.4, in particular an axial groove or axial notch. The balls 33.11 of the bearing 33.12 of the respective second bearing module 330.4 are thus coupled to the running surface 330.6 on the gearwheel 332, on the one hand, and to the running surface 330.6 on the second spring module 330.3, and thus indirectly to the housing 331 by way of the second spring module 330.3, on the other hand.

The alternative second bearing assembly 330.0 is in particular specified in such a manner that the radial support and movable mounting (also referred to as radial guiding function) of the gearwheel 332 and the axial support and movable mounting (also referred to as axial guiding function) of the gearwheel 332 are designed separately from one another.

The second bearing module 330.4, the second spring module 330.3 and the friction bearing 330.5 are preferably designed as separate units, as is illustrated in FIG. 11. High axial forces (without generating high friction momentums) as well as high radial forces (while adhering to exact distances between axes for ideal rolling) can be absorbed by the alternative second bearing assembly 330.0.

Figure 12:
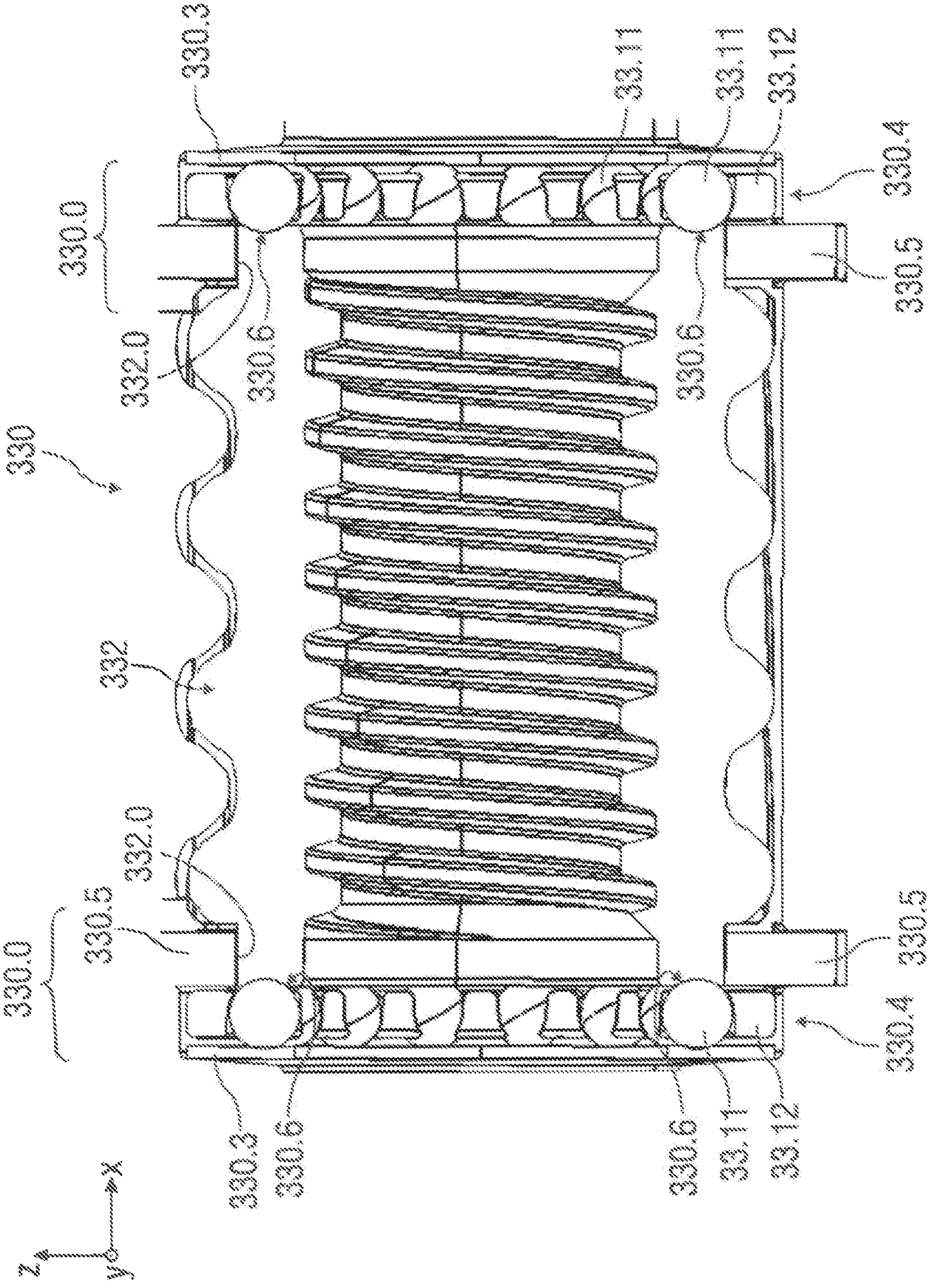
FIG. 12 schematically shows the gear unit having the second bearing assembly according to FIG. 11 in a sectional illustration.

FIG. 12 schematically shows the gear unit 330 having the second bearing assembly 330.0 for the gearwheel 332 according to FIG. 11 in the assembled state, in a sectional illustration.

The balls 33.11 of the second bearing module 330.4 rest and roll on the running surface 330.6, in particular on the end side on the collar 332.0 of the gearwheel 332. The bearing 33.12 is designed as an axial ball bearing. The balls 33.11 are rotatably mounted in a carrier ring.

The second spring module 330.3 is designed as a spring disk or as a spring ring.

The friction bearing 330.5 is of an annular design and disposed on the collar 332.0 of the gearwheel 332. The thickness of the friction bearing 330.5 can correspond to the length of the collar 332.0, for example.

Figure 13:
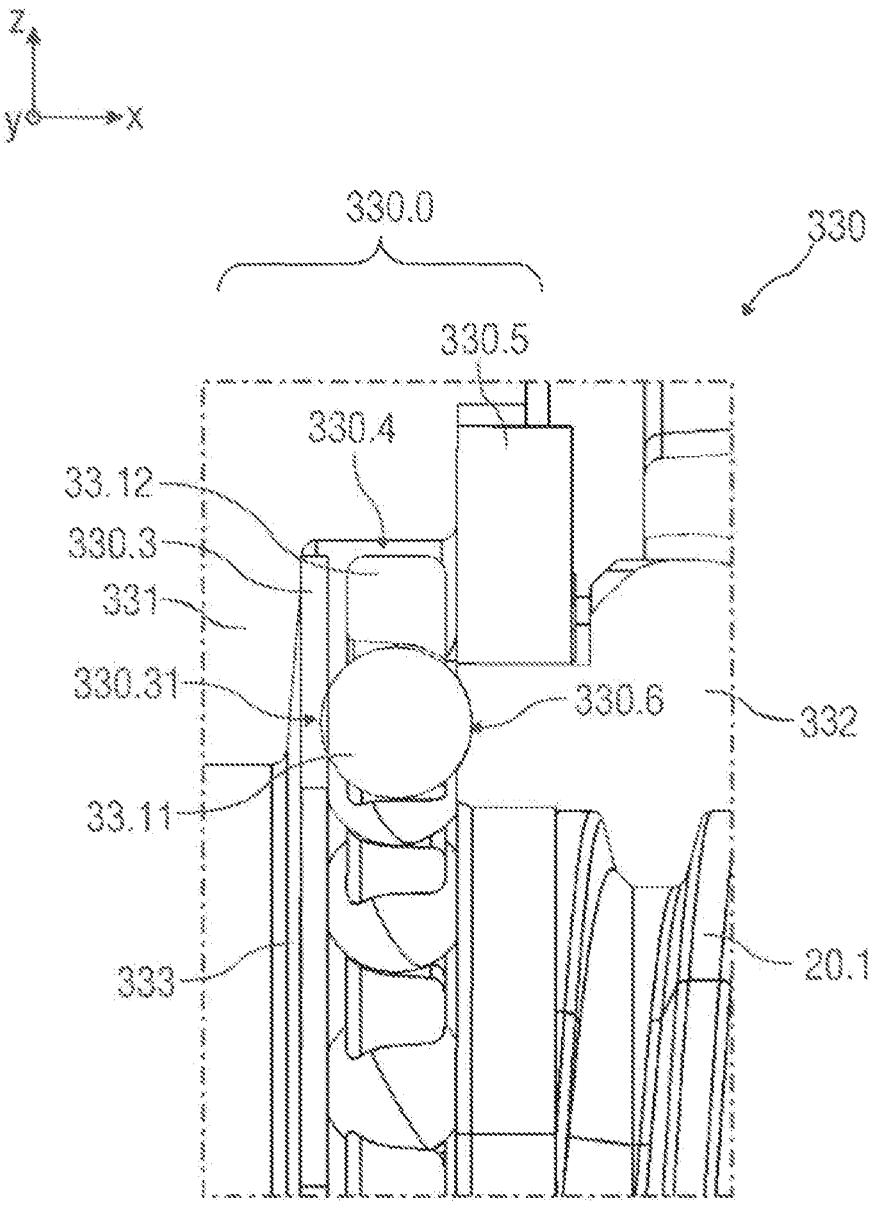
FIG. 13 shows in fragments the gear unit of FIG. 12 in the region of the second bearing assembly in a longitudinal sectional view.

FIG. 13 shows in fractions the gear unit 330 of FIG. 12 in the region of the second bearing assembly 330.0, in a longitudinal sectional view.

A movement of the gearwheel 332 along the spindle 20 is caused by the rotation of the gearwheel 332 on the spindle 20 (illustrated in FIG. 4), by way of the external thread 20.1 designed as a trapezoidal thread, for example. The gearwheel 332 can be axially and radially supported on both sides by way of the respective second bearing assembly 330.0. For axial support, the second bearing assembly 330.0 comprises the second bearing module 330.4, designed as an axial ball bearing. The bearing module 330.4 comprises the bearing 33.12 having a bearing cage and balls 33.11, as is illustrated in FIG. 11. The second bearing module 330.4 is supported on the housing 331 by way of the second spring module 330.3 (illustrated in FIG. 12).

The second spring module 330.3 is disposed between the housing 331 and the second bearing module 330.4, designed as an axial ball bearing. The spring module 330.3, designed as a spring ring or spring disk, for example, is illustrated in FIG. 13 while overlapping with one of the balls 33.11. In reality, this second spring module 330.3 is inclined by the pre-loading (cupped spring washer principle).

For example, the second spring module 330.3, designed as a spring disk, is supported in or on the housing 331 in the region of the outer larger diameter.

A running notch 330.31 on the spring module 330.3 is formed in the region of an inner smaller diameter, the balls 33.11 rolling on said running notch 330.31.

A void 333 for enabling the required spring travel is formed between the second spring module 330.3 (spring disk) and the housing 331, below the balls 33.11. In other words: the second bearing module 330.4 is mounted in an axially spring-elastic manner in the housing 331 so as to be spring pre-loaded by the second spring module 330.3. Should a spring movement arise under a load acting thereon, in particular an axial load, one of the second spring modules 330.3 at one of the axial ends is impinged with more force than the other second spring module 330.3 at the other axial end of the gearwheel 332. This other second spring module 330.3 is relieved. The second spring modules 330.3 are conceived in such a manner that the spring pre-loading is never completely lost.

The gearwheel 332 possesses running surfaces 330.6 on each end, in particular on the end side on the respective collar 332.0. The running surfaces 330.6 are designed as ball raceways, in particular axial notches for the respective bearing 33.12, so as to define the running direction of the balls 33.11.

LIST OF REFERENCE SIGNS

1 Vehicle seat
2 Seat part
4 Backrest
6 Longitudinal adjuster
10 Pair of rails
12 Floor rail
14 Seat rail
16 Clearance
18 Cavity
20 Spindle
20.1 External thread
24 Spindle holder
30 Geared motor
31 Motor
31.1 Interface
32 Motor shaft
33 Gear unit
33.0 First bearing assembly
33.1 Housing
33.2 Gearwheel
33.3 First spring module
33.4 First bearing module
33.5 Internal thread of the gearwheel
33.6 Drive wheel
33.7 External nut profile
33.8 Gearbox wheel
33.9 External profile
33.10 Ball set
33.11 Ball
33.12 Bearing
33.13 Ball raceway
33.14 Through-opening
33.15 Ball bearing ring
33.16 Running groove
33.17 End face
33.18 Housing internal face
33.19 Step
33.20 Collar
33.21 Housing portion
300 Geared motor
310 Motor
311 Interface
330 Gear unit
330.0 Second bearing assembly
330.3 Second spring module
330.31 Running notch
330.4 Second bearing module
330.5 Friction bearing
330.51 Extension
330.6 Running surface
331 Housing
332 Gearwheel
332.0 Collar
333 Void
A1, A2, A3 Axis
P Arrow
X Longitudinal direction
Y Transverse direction
Z Vertical direction

The invention claimed is:

1. A gear unit, comprising:

a housing, a gearwheel disposed in the housing, characterized by further comprising a bearing assembly mounting the gearwheel in the housing, whereby the gearwheel is supported so as to be axially spring-elastic and mounted so as to be movable and pre-loaded in relation to the housing, wherein a first bearing assembly comprises at least one first spring module and at least one first bearing module, and the first spring module is arranged in combination with the first bearing module on each end face of the gearwheel so that a plurality of ball bearings in the at least one first bearing module roll in a raceway formed in each end face of the gearwheel, wherein the first spring module is specified and disposed in such a manner that the gearwheel is disposed so as to be pre-loaded in the housing wherein provided is at least one second bearing assembly which is designed in such a manner that the gearwheel is supported axially as well as radially and mounted so as to be movable in relation to the housing, and wherein the second bearing assembly for radial support comprises at least one friction bearing, and for axial support one second bearing module and one second spring module.

2. The gear unit as claimed in claim 1, wherein the first spring module and the first bearing module are designed as a resiliently mounted bearing for the gearwheel in the housing, and are disposed on at least one end of the gearwheel in such a manner that the gearwheel is supported so as to be axially spring-elastic and mounted so as to be movable in relation to the housing.

3. The gear unit as claimed in claim 1, wherein the first spring module is specified in such a manner that a corresponding spring force acts on the gearwheel by way of the first bearing module, on the one hand, and the gearwheel by way of the first spring module is supported in a spring-elastic manner on the housing, on the other hand.

4. The gear unit as claimed in claim 1, wherein the first spring module is designed as a spring ring having a running groove for balls of the first bearing module.

5. The gear unit as claimed in claim 1, wherein the friction bearing is disposed on at least one end of the gearwheel in such a manner that the gearwheel is supported radially and mounted so as to be movable in relation to the housing.

6. The gear unit as claimed in claim 1, wherein the friction bearing is designed as a sliding bushing for absorbing radial loads.

7. The gear unit as claimed in claim 1, wherein the second bearing module is designed as a bearing with balls which roll on a running surface on the end side on the friction bearing.

8. The gear unit as claimed in claim 1, wherein the second bearing module and the friction bearing are designed as separate units.

9. The gear unit as claimed in claim 1, wherein the gear unit is designed as an axial gear having axes of a drive wheel and of the gearwheel and of a gearbox wheel that run in parallel vertically above one another.

10. A geared motor comprising at least one motor having a motor shaft and the gear unit as claimed in claim 1, wherein a drive wheel is coupled, or able to be coupled, directly or indirectly to the motor shaft, and the gearwheel is coupled, or able to be coupled, directly or indirectly to the drive wheel.

11. The geared motor as claimed in claim 10, wherein the gearwheel of the gear unit has an external nut profile, wherein the motor shaft and/or a gearbox wheel have/has a corresponding external profile which is operatively connected directly to the external nut profile of the gearwheel, wherein the gearwheel is an output wheel and is operatively connected to a spindle of a longitudinal adjuster for a vehicle seat.

12. A longitudinal adjuster for a vehicle seat, comprising at least one pair of rails which has a seat rail and a floor rail on which the seat rail is displaceably guided; the geared motor as claimed in claim 10 as a drive device for adjusting the seat rail relative to the floor rail, wherein an internal thread of the gearwheel is operatively connected to an external thread of a spindle, wherein the gearwheel for longitudinally adjusting the seat rail is mounted so as to be rotatable on the spindle and movable along the spindle.

* * * * *